(12) United States Patent
Brown et al.

(10) Patent No.: US 8,919,744 B1
(45) Date of Patent: Dec. 30, 2014

(54) WATER AERATION SYSTEM AND METHOD

(75) Inventors: Travis W. Brown, Leland, MS (US); Eugene L. Torrans, Leland, MS (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 648 days.

(21) Appl. No.: 13/206,984

(22) Filed: Aug. 10, 2011

(51) Int. Cl.
*B01F 3/04* (2006.01)
*A01K 61/00* (2006.01)
*A01K 63/04* (2006.01)

(52) U.S. Cl.
CPC ........... *B01F 3/0446* (2013.01); *B01F 3/04496* (2013.01); *A01K 63/04* (2013.01); *A01K 61/00* (2013.01)
USPC ............... 261/77; 261/30; 119/215; 119/232; 210/150

(58) Field of Classification Search
CPC ..................................... B01F 3/0446
USPC ..................................... 261/77; 119/232, 215
See application file for complete search history.

(56) References Cited

U.S. PATENT DOCUMENTS

| | | | |
|---|---|---|---|
| 3,841,999 A | 10/1974 | Bennett et al. | |
| 4,416,781 A * | 11/1983 | Bailey et al. | 210/629 |
| 4,488,508 A | 12/1984 | Heideman | |
| 4,624,791 A * | 11/1986 | Ferriss | 210/704 |
| 4,664,680 A | 5/1987 | Weber | |
| 5,320,068 A | 6/1994 | Redditt | |
| 5,772,886 A | 6/1998 | Bettle | |
| 6,017,020 A * | 1/2000 | Baughman et al. | 261/36.1 |
| 6,773,595 B2 * | 8/2004 | Gantzer | 210/605 |
| 2009/0321369 A1 * | 12/2009 | Galletta, Jr. | 210/758 |

OTHER PUBLICATIONS

Ekofinn-Pol. "Blowers Robuschi." Nov. 12, 2008 <http://web.archive.org/web/20081112052219/http://www.ekofinn-pol.com.pl/ang/products/roots.php?>.*
Center for Watershed Protection. "Stormwater Pond & Wetland Maintenance Guidebook" Sep. 2004.*

* cited by examiner

Primary Examiner — Robert A Hopkins
Assistant Examiner — Stephen Hobson
(74) Attorney, Agent, or Firm — Robert D. Jones; John D. Fado; Lesley Shaw

(57) ABSTRACT

The aquaculture pond aeration system is essentially comprised of a "u" shaped conduit that extends below the pond bottom. A sparger assembly is positioned below the pond bottom in the outlet side of the conduit. The sparger emits air into the outlet side of the conduit thereby aerating the water and causing a hydrostatic pressure imbalance between the inlet side and the outlet side of the conduit. The pressure imbalance causes the pond water to circulate through the conduit and thereby aerate the aquaculture pond.

12 Claims, 1 Drawing Sheet

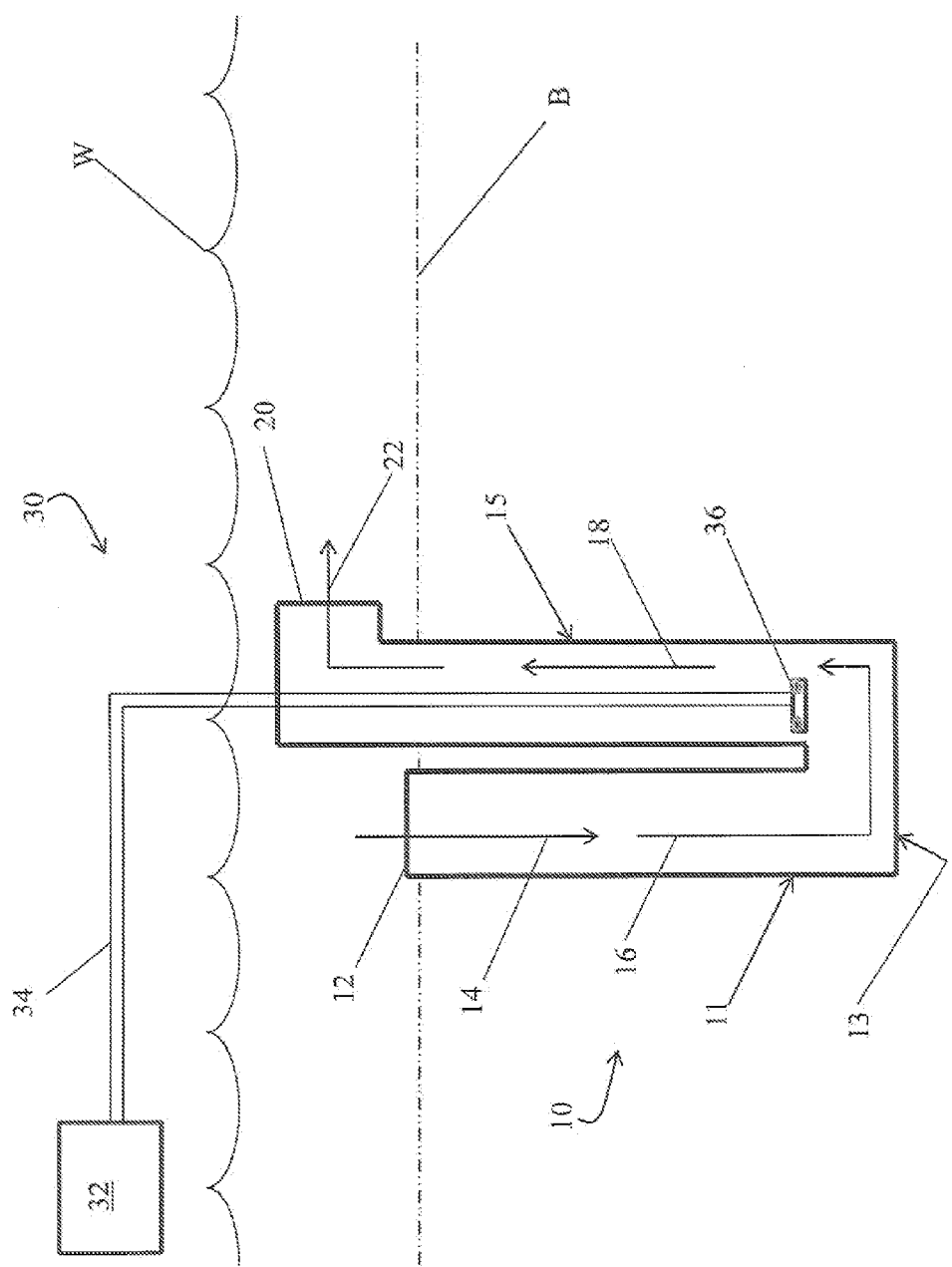

WATER AERATION SYSTEM AND METHOD

FIELD OF THE INVENTION

The present invention relates to a method and apparatus for aerating pond water. Specifically, the invention relates to a method and apparatus for aerating aquaculture ponds primarily used to raise catfish.

BACKGROUND OF THE INVENTION

Catfish farming is the largest segment of aquaculture in the US. Catfish are primarily cultured in watershed ponds and are harvested by seining. Despite land and labor costs, pond production can be profitable if water quality is prudently managed. When pond dissolved oxygen (DO) concentrations are low (<2-3 mg/L), the ponds must be aerated to ensure the health of the fish. Aeration is the principal management tool that allows growers to achieve higher feeding rates, increased production, and decreased cost per unit fish produced. US Department of Agriculture research shows that feed conversion ratio (FCR) can be significantly improved by raising the DO concentration above 3.0 mg/L (although catfish can survive at substantially lower levels). At elevated DO levels, the aquaculture process is generally more efficient because the catfish grow faster in a shorter production period, and also have better survival rates.

The catfish aquaculture industry currently relies primarily on rotary "agitating-type" surface splash aerators to aerate aquaculture ponds. Agitating-type aerators are generally powered with 10-hp (7.5-kW) electric motors and average industry usage is approximately 2.6 hp (1.9-kW) per acre.

Paddle-wheel aerators are a common example of agitating-type aerators. While paddle-wheel aerators add significant amounts of oxygen to the water, they are required to mechanically move large amounts of water to be effective. While this is acceptable for routine operations, when the DO level drops to very low concentrations (as when a plankton bloom dies and decomposes), a paddle-wheel aerator will frequently not immediately produce a DO concentration high enough to keep affected fish alive. If a large number of portable (tractor-powered) aerators are not immediately brought in to assist with the emergency aeration, the affected fish will be severely stressed and may die.

The prior art also includes aeration systems with a concentric pipe design. Concentric pipe aerators draw water into an annulus between a relatively large outer casing and a smaller diameter inner pipe. Compressed air is directed into the inner pipe so that pond water circulates down annulus and then up through the inner pipe and back into the pond. However, this design has proven impractical because of the relatively large size requirements for the outer casing and because the annulus is prone to plugging by mud and pond debris. Systems with a concentric pipe design can also be relatively difficult to clean and repair.

The need exists for a system and method for aerating aquaculture ponds that efficiently maintains a healthy aquaculture environment and is capable responding quickly to temporary conditions that cause low oxygen environments. The current invention comprises a method and apparatus that relies on an injection of pressurized air to create a hydrostatic imbalance (rather than a mechanical agitator) to circulate aquaculture pond water and thereby aerate the aquaculture pond.

SUMMARY OF THE INVENTION

The current invention is directed to an aquaculture pond aeration system. The system is essentially comprised of a "u" shaped conduit with an inlet side, an outlet side, and a base. The conduit inlet side extends from above the bottom of the aquaculture pond to the base located below the pond bottom. The outlet side extends from the base to an outlet above the bottom of the pond. The system also includes a sparger assembly positioned below the pond bottom in the outlet side of the conduit. The system is structured so that air is directed to the sparger and the sparger emits the air into the water in the conduit's outlet side, thereby aerating the water and creating a hydrostatic pressure imbalance between the inlet side and the outlet side of the conduit. The pressure imbalance causes the pond water to circulate through the conduit and thereby aerate the pond.

The current invention is also directed to a method of aerating an aquaculture pond. A "u" shaped conduit is first installed in the aquaculture pond. The conduit is designed to have an inlet side, an outlet side, and a base. The conduit inlet side extends from above the pond bottom to the base positioned below the pond bottom. The conduit outlet side extends from the base to an outlet above the bottom of the pond. A sparger assembly is positioned below the pond bottom in the outlet side of the conduit. Compressed air is directed to, and subsequently emitted from the sparger and into the outlet side of the conduit, thereby aerating the water in the outlet side of the conduit. The aerated water causes a hydrostatic pressure imbalance between the inlet and outlet sides of the conduit so that water circulates through the conduit and thereby aerates the aquaculture pond.

BRIEF DESCRIPTION OF THE DRAWINGS

FIG. 1 is a sectional schematic of the current invention.

DETAILED DESCRIPTION OF PREFERRED EMBODIMENTS

As generally shown in FIG. 1, the present invention comprises a system and method of aerating an aquaculture pond. The system generally comprises a u-shaped conduit 10 and a gas diffuser assembly 30.

The inlet 12 and outlet 20 of the conduit 10 are preferably positioned below the water surface W and above the bottom B of the aquaculture pond. In the preferred embodiment, the conduit may be between 0.3 and 1.5 meters in diameter. Both the inlet 12 and the outlet 20 may or may not include screening material to prevent debris from entering the conduit 10. For reasons associated with the health of the catfish and the efficiency of the farming operation, the minimum depth of an aquaculture pond is about 1 meter.

The conduit 10 has an inlet side 11, a base 13, and an outlet side 15. During system operation, water is circulated through the inlet 12 and down the inlet side 11 of the conduit 10 below the bottom of the pond B in the direction of the arrow 14. The water is then circulated around the base 13 of the conduit 10 in the direction of the arrow 16, and then up the outlet side 15 of the conduit 10 in the direction of the arrow 18. The water is subsequently circulated out of the conduit outlet 20 in the direction of the arrow 22.

The water in the conduit circulates without mechanical assistance because a compressor/blower 32 directs compressed air through hollow tubing 34 to a sparger assembly 36 positioned in the conduit's outlet side 15 near the base 13 of the conduit 10. The hydrostatic pressure differential between the (non-aerated) water in the inlet side 11 of the conduit, and the (aerated) water in the outlet side 15 of the conduit causes the water in the conduit 10 to circulate and cycle through the conduit 10 without mechanical lift.

In the preferred embodiment, the sparger assembly 36 comprises a tubular matrix with multiple air nozzles arranged to symmetrically disperse air into pond water in the outlet side 15 of the conduit 10. In alternative embodiments, the sparger 36 may comprise any air distribution configuration known in the art. In the preferred embodiment, the sparger 36 is positioned so that the distance between the sparger 36 and the surface of the water W is between 1.5 m and 10 m. The inventors have found that (in general) the most efficient conduit configuration positions the sparger as far below water level as is operationally practical.

The compressor 32 is preferably positioned on the aquaculture pond's bank, but the compressor 32 may also be positioned on a floating platform or in any other manner known in the art. Although FIG. 1 shows the tubing 34 as suspended over the water W and directed through the outlet side 15 of the conduit 10, the tubing 34 may be directed below the ground or water and into the conduit 10, or otherwise directed to the sparger 36 in any manner known in the art. The tubing 34 may be rigid or flexible and may also be buoyant so that the tubing floats on the surface of the pond.

EXAMPLE

The inventors designed and tested a prototype of the current invention that was generally designed as described supra. The inlet of the u-tube conduit was positioned at approximately the bottom of the aquaculture pond, and the outlet side of the conduit extended upwardly to about the water's surface. The pond was approximately 1.2 meters deep.

The u-tube conduit was constructed of 0.9 meter diameter galvanized, corrugated, culvert pipe. A high pressure blower/compressor (positioned on the pond bank) directed pressurized air through an air supply line to the air diffusing sparger assembly positioned near the base of the outlet side of the conduit. The sparger was positioned 6.1 meters below the water surface. The prototype blower comprised a Roots 42 URAI rotary positive displacement blower. The air supply line extended vertically down the outlet side of the conduit to the sparger.

The sparger emitted the pressurized air in a uniform radial pattern. Air from the sparger assembly caused water in the outlet side of the conduit to rise because the average density (specific gravity) of the water-air mixture in the outlet side of the conduit was less than that of the water in the inlet side. When sufficient air was continuously injected into outlet side of the conduit (via the sparger), an imbalance between the outlet and inlet sides of the conduit resulted in continuous circulation of water down the inlet side of the conduit and up the outlet side. The inventors found that a minimum air injection rate of about 2.4 cubic feet per minute was required to adequately induce circulation and aerate the pond.

The inventors compared the efficiency of the prototype to traditional paddle-wheel type aerators. For example, a 10-hp paddle-wheel aerator with a standard oxygen transfer rate (SOTR) of 14.1 kg $O_2$/h, and a standard aeration effect (SAE) of 2.3 kg $O_2$/kW·h would be able to raise the DO concentration in a 4-acre pond from 0 to 3 mg/l in approximately 4.2 hours and would consume 25.7 kW·h of electricity.

In comparison, the prototype demonstrated an SOTR and SAE of 9.5 kg $O_2$/h and 1.3 kg $O_2$/kW·h, respectively. However, the current invention has the capability of concentrating aeration in (for example) 1 acre zones so that it would only take approximately 1.6 hours and use 11.4 kWh of electricity to increase the DO within the 1 acre zone from 0 to 3 mg/l.

The ability to concentrate relatively large volumes of dissolved oxygen in a relatively small portion of a pond is particularly advantageous in emergency situations when time is of the essence. If dissolved oxygen levels drop quickly, the design of the current invention allows the fish to congregate around the conduit outlet where oxygen content is the highest and thereby greatly increase their chances of survival.

Additionally, maintenance and projected maintenance for the prototype invention compares very favorably to conventional paddle-wheel aerators, which require a greater amount of repair and maintenance over time. Paddle-wheel aerators are more reliant on physical and mechanical manipulation of the affected aquaculture pond water and therefore have a larger number of moving parts with accompanying stresses and failures and a correspondingly greater chance of mechanical breakdowns. Further, paddle-wheel aerators are typically mounted on floats that are positioned 3-5 meters away for the pond bank for maximum effect and also to prevent levy erosion.

By contrast, essentially all of the moving parts in the current invention are associated with the air blower/compressor, which does not physically manipulate or impact the water. The blower/compressor of the current invention is typically positioned on a pond bank in a location that is easy to access and thereby facilitates easy maintenance. The air hose attached to the compressor/blower transfers air to the sparger so (unlike a paddle-wheel system) there is no need to co-locate the blower/compressor hardware with the air distribution device (i.e. the sparger).

Further, the current invention prototype uses a rotary lobe compressor blower that can be retrofitted with the 10-hp electric motor currently used with conventional paddle-wheel aerators. This minimizes the capital costs associated with conversion from the current paddle-wheel system to the air diffuser system of the current invention.

For the foregoing reasons, it is clear that the current invention provides an innovative and efficient method and apparatus for aerating an aquaculture pond. The invention may be modified in multiple ways and applied in various technological applications. The current invention may be modified and customized as required by a specific operation or application, and the individual components may be modified and defined, as required, to achieve the desired result.

Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A pond aeration system comprising:
an aquaculture pond structured to support living fish;
a "u" shaped pipe, the pipe having an inlet side, an outlet side, and a base; the pipe inlet side extending from above a pond bottom to the base below the pond bottom, and the outlet side extending from the base to an outlet above the pond bottom;
a sparger assembly positioned at an intersection of the outlet side and the base below the pond bottom;
wherein the system is structured so that air is directed to the sparger and the sparger emits the air into the outlet side, thereby causing a hydrostatic pressure imbalance between the inlet side and the outlet side so that water circulates through the pipe, the system being structured so that the sparger emits a sufficient volume of air so that the dissolved oxygen level in at least a portion of the pond supports the living fish.

2. The system of claim 1 wherein the system is structured to raise the dissolved oxygen level in the pond above 3 mg/L.

3. The system of claim 1 wherein the pond is at least 1 meter deep.

4. The system of claim 1 where the distance between the sparger and a surface of the water is between 1.5 and 10 meters.

5. The system of claim 1 wherein the sparger is supplied with air via an air compressor positioned on a bank of the pond.

6. The system of claim 5 wherein the air compressor comprises an electric motor in combination with a rotary lobe blower.

7. The system of claim 1 wherein the sparger comprises a tubular matrix with multiple air nozzles arranged to symmetrically disperse air.

8. The system of claim 1 wherein the pipe is constructed from galvanized, corrugated, culvert pipe with a diameter of about 1 meter.

9. A method of aerating an aquaculture pond comprising:
  installing a "u" shaped pipe in an aquaculture pond, the pipe having an inlet side, an outlet side, and a base; the pipe inlet side extending from above a pond bottom to the base below the pond bottom, and the outlet side extending from the base to an outlet above the pond bottom;
  positioning a sparger assembly below the pond bottom in the outlet side at an intersection of the base and the outlet side;
  directing air into the sparger;
  emitting air from the sparger and into the outlet side, thereby aerating water in the pond and causing a hydrostatic pressure imbalance between the inlet side and the outlet side so that water circulates through the pipe and thereby aerates the pond so that the sparger emits a sufficient volume of air so that the dissolved oxygen level in at least a portion of the pond is sufficient to support living fish.

10. The method of claim 9 wherein in the positioning step, the distance between the sparger and a surface of the water is between 1.5 and 10 meters.

11. The method of claim 9 wherein in the emitting step, the dissolved oxygen level in the pond above 3 mg/L.

12. The method of claim 9 wherein in the installing step, the pipe is constructed from galvanized, corrugated, culvert pipe with a diameter of about 1 meter.

\* \* \* \* \*